(12) United States Patent
Selvik et al.

(10) Patent No.: US 10,878,527 B2
(45) Date of Patent: Dec. 29, 2020

(54) VARIABLE RESOLUTION GRAPHICS PROCESSING

(71) Applicant: Arm Limited, Cambridge (GB)

(72) Inventors: Andreas Loeve Selvik, Cambridge (GB); Samuel Martin, Waterbeach (GB); Peter William Harris, Cambridge (GB); Jakob Axel Fries, Malmo (SE)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/390,215

(22) Filed: Apr. 22, 2019

(65) Prior Publication Data

US 2019/0347757 A1    Nov. 14, 2019

(30) Foreign Application Priority Data

May 9, 2018  (GB) .................................. 1807558.0

(51) Int. Cl.
| | | |
|---|---|---|
| *G06T 1/20* | (2006.01) | |
| *G06T 3/40* | (2006.01) | |
| *G06T 7/11* | (2017.01) | |
| *G06T 15/00* | (2011.01) | |

(52) U.S. Cl.
CPC .................. *G06T 1/20* (2013.01); *G06T 3/40* (2013.01); *G06T 7/11* (2017.01); *G06T 15/005* (2013.01)

(58) Field of Classification Search
CPC ..... G06T 1/20; G06T 3/40; G06T 7/11; G06T 15/005; G06T 15/20; G06F 3/013
See application file for complete search history.

(56) References Cited

U.S. PATENT DOCUMENTS

| 10,083,538 B2 * | 9/2018 | Li .......................... G06T 3/0093 |
|---|---|---|
| 2013/0034309 A1 | 2/2013 | Nystad |
| | | (Continued) |

FOREIGN PATENT DOCUMENTS

| GB | 2553744 | 3/2018 |
|---|---|---|
| GB | 2553353 | 7/2018 |
| | (Continued) | |

OTHER PUBLICATIONS

GB Combined Search and Examination Report dated Oct. 24, 2018, GB Patent Application No. GB1807558.0.

(Continued)

*Primary Examiner* — Maurice L. McDowell, Jr.
*Assistant Examiner* — Donna J. Ricks
(74) *Attorney, Agent, or Firm* — Vierra Magen Marcus LLP

(57) ABSTRACT

A graphics processor performs graphics processing in respect of a region of a render output. The graphics processing comprises obtaining a scaling factor corresponding to a desired resolution for the region. The graphics processing further comprises, in accordance with the desired resolution, obtaining scaled graphics geometry to be rendered for the region and selecting a subregion of the region to be rendered in respect of the region. The selected subregion is then rendered using the scaled graphics geometry, thereby providing a subregion of data elements rendered in accordance with the desired resolution. The graphics processor can provide efficient and flexible graphics processing when performing variable resolution rendering.

18 Claims, 8 Drawing Sheets

(56) References Cited

U.S. PATENT DOCUMENTS

| | | | |
|---|---|---|---|
| 2013/0195352 A1 | 8/2013 | Nystad | |
| 2017/0200308 A1* | 7/2017 | Nguyen | G06T 15/005 |
| 2018/0137602 A1* | 5/2018 | Spitzer | G06T 3/4007 |
| 2018/0308266 A1* | 10/2018 | Surti | G06T 11/40 |
| 2018/0350036 A1 | 12/2018 | VanReenen | G06T 15/20 |
| 2018/0357749 A1* | 12/2018 | Young | G09G 5/001 |
| 2018/0357752 A1* | 12/2018 | Ho | G06F 3/147 |

FOREIGN PATENT DOCUMENTS

| | | |
|---|---|---|
| WO | 2018/118203 | 6/2018 |
| WO | 2018/175625 | 9/2018 |

OTHER PUBLICATIONS

Liu, "Lens Matched Shading and Unreal Engine 4 Integration Part 1," NVIDIA Corporation, GameWorks Blog, Jan. 18, 2017, available at: https://developer.nvidia.com/lens-matched-shading-and-unreal-engine-4-integration-part-1.

"VRWorks—Multi-Res Shading," NVIDIA Corporation, downloaded on May 1, 2018, available at: https://developer.nvidia.com/vrworks/graphics/multiresshading.

Saleh, et al., "QCOM Framebuffer Foveated," Qualcomm Technologies, Inc., May 10, 2017, available at: https://www.khronos.org/registry/OpenGL/extensions/QCOM/QCOM_framebuffer_foveated.txt.

* cited by examiner

VARIABLE RESOLUTION GRAPHICS PROCESSING

BACKGROUND

The technology described herein relates to graphics processing, and in particular to the operation of a graphics processor when performing variable resolution rendering.

Variable resolution ("foveated") rendering is a rendering technique where one or more parts of a frame (image) being displayed are rendered at a higher resolution for display, but one or more other parts of the frame are rendered at a lower resolution.

This is based on the fact that the area of the frame that the user is looking at directly may need to be rendered at a higher resolution for visual acceptability, while the peripheral area of the frame that the user is not directly looking at can be rendered at a lower resolution whilst still appearing visually acceptable. This can then be used to reduce the rendering burden on the graphics processing unit (GPU), by rendering the peripheral area at a lower resolution, rather than rendering the entire frame being displayed at the highest required ("foveal") resolution.

Variable resolution rendering may be carried out by identifying one or more "fixation points" where higher resolution areas of the frame will be rendered, with the areas further away from the fixation point(s) being rendered with a lower resolution. Thus, each fixation point may indicate the highest resolution area of the frame and, in some cases, is intended to correspond to the centre of the eye's retina (the fovea).

Another use for variable resolution rendering is when rendering images for virtual reality displays (e.g. virtual reality head-mounted displays (VR HMDs)). High resolution head-mounted virtual reality displays typically use lenses that feature severe pin-cushion distortion. This pin-cushion distortion can be corrected by passing the rendered image through a barrel distortion. The effect of this is that the rendered image towards the centre of the display (for each eye) is magnified whereas the peripheral area is minified. The effect of this then is that the peripheral area can be rendered at a lower quality than the central, magnified area, without any significant loss in the overall visual effect for the user.

When performing variable resolution rendering, the locations of the highest resolution areas of the frame (e.g. the fixation point(s)) may be determined in any suitable and desired manner. For example, some form of head tracking or eye tracking system may be used to try to identify where the user is looking at the image, so as to identify the area of the frame that should be rendered with the highest resolution. The location of higher resolution areas of the frame may also or instead be substantially fixed, e.g. based on lens distortion.

The Applicants believe that there remains scope for improvements to the operation of graphics processors when performing variable resolution rendering.

BRIEF DESCRIPTION OF THE DRAWINGS

A number of embodiments of the technology described herein will now be described by way of example only and with reference to the accompanying drawings, in which.

Like reference numerals are used for like components where appropriate in the drawings.

DETAILED DESCRIPTION

Figure 1:
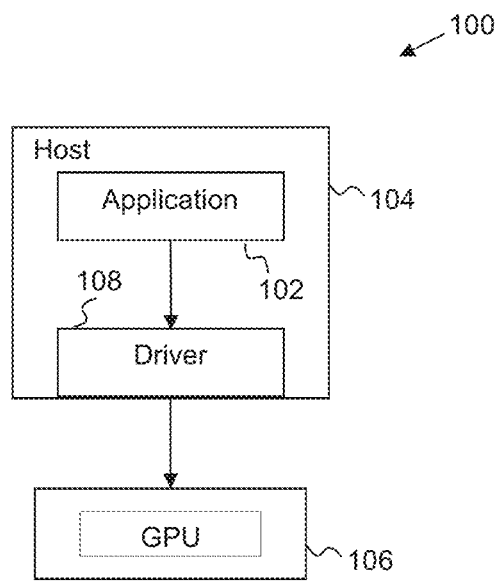
FIG. 1 shows a computer graphics processing system according to an embodiment of the technology described herein.

An embodiment of the technology described herein comprises a method of operating a graphics processor comprising:
  performing graphics processing in respect of a region of a render output, wherein the region is one of plural regions into which the render output is divided for rendering purposes, wherein performing graphics processing in respect of the region comprises:
    obtaining a desired resolution profile for the region;
    obtaining, in accordance with the desired resolution profile for the region, scaled graphics geometry to be rendered for the region;
    selecting, in accordance with the desired resolution profile for the region, a subregion of the region to be rendered in respect of the region; and
    performing rendering in respect of the region, wherein performing rendering in respect of the region comprises rendering the subregion of the render output using the scaled graphics geometry, thereby providing a rendered subregion of data elements; and
    outputting, in respect of the region, an output array of data elements comprising the rendered subregion of data elements.

Another embodiment of the technology described herein comprises a graphics processor, the processor comprising:
  a processing circuit configured to perform graphics processing in respect of a region of a render output, wherein the region is one of plural regions into which the render output is divided for rendering purposes, wherein performing graphics processing in respect of the region comprises:
    obtaining a desired resolution profile for the region;
    obtaining, in accordance with the desired resolution profile for the region, scaled graphics geometry to be rendered for the region;

selecting, in accordance with the desired resolution profile for the region, a subregion of the region to be rendered in respect of the region; and performing rendering in respect of the region, wherein performing rendering in respect of the region comprises rendering the subregion of the render output using the scaled graphics geometry, thereby providing a rendered subregion of data elements; and an output circuit configured to output, in respect of the region, an output array of data elements comprising the rendered subregion of data elements.

The technology described herein accordingly comprises obtaining a resolution profile for a region (e.g. tile) of a render output (e.g. texture or frame). This can, for example, allow a (and, e.g., each) region of the render output to be rendered at a particular desired resolution for that region. The technology described herein further comprises, in accordance with the desired resolution profile for the region, obtaining scaled graphics geometry to be rendered for the region and selecting a subregion of the region to be rendered in respect of the region. The selected subregion can then be rendered using the scaled graphics geometry to provide a subregion of data elements for the region that is rendered in accordance with the desired resolution profile for the region. This can, for example, reduce the processing burden placed on the graphics processor, e.g. by only needing to render a smaller subregion of the region when the region is to be rendered at a lower resolution. Furthermore, since the selected subregion can take a range of sizes (e.g. having a granularity that relates to the number of rows and/or columns of sampling positions that may be selected for rendering in respect of the region), there can be a corresponding range of possible resolutions at which rendering can be performed in respect of the region. The technology described herein can therefore provide efficient and flexible graphics processing, e.g. when performing variable resolution rendering.

The graphics processor may perform respective graphics processing in the manner described herein in respect of each one of plural regions of the render output. The plural regions may represent some or all of the same render output but at different resolutions, e.g. when performing foveated rendering.

A region may comprise any desired and suitable region of the render output. For example, the render output may be divided into plural graphics processing tiles for rendering purposes. A region may comprise one or more of these graphics processing tiles. Thus, the region may comprise one or more graphics processing tiles, such as a single graphics processing tile.

The graphics processor may therefore comprise a tile-based graphics processor. In tile-based graphics processing, the two-dimensional render output (i.e. the output of the rendering process, such as an output texture or frame to be displayed) is rendered as a plurality of smaller regions, usually referred to as "tiles". The tiles are each rendered separately. The rendered tiles can then be recombined to provide the complete render output (e.g. texture or frame for display).

In such arrangements, the render output is typically divided (by area) into regularly-sized and shaped rendering tiles (they are usually e.g., squares or rectangles) but this is not essential. Other terms that are commonly used for "tiling" and "tile-based" rendering include "chunking" (the rendering tiles are referred to as "chunks") and "bucket" rendering. The terms "tile" and "tiling" will be used hereinafter for convenience, but it should be understood that these terms are intended to encompass all alternative and equivalent terms and techniques.

An advantage of such tile-based rendering is that memory bandwidth can be reduced. For example, a tile being processed can be stored in local storage (a "tile buffer") and only be output to memory once processed. A further advantage is that graphics geometry that does not appear in a given tile does not have to be considered when processing that tile, and may, for example, be ignored when the tile is being processed. This allows the overall amount of graphics processing necessary for a given render output to be reduced. A further advantage of tile-based rendering in the context of the technology described herein is that each tile may be rendered in accordance with its own particular resolution profile.

The regions (tiles) that the render output is divided into for rendering purposes can be any suitable and desired such regions. The size and shape of the regions may depend on the tile configuration that the graphics processor is configured to use and handle. The regions may be all the same size and shape (i.e. regularly-sized and shaped), although this is not essential. The regions may be square or rectangular. The regions may not overlap. The size and number of regions can be selected as desired. In an embodiment, each region is 16×16 or 32×32 sampling positions (e.g. for 16×16 or 32×32 pixels) in size. A texel or pixel in the render output may correspond to one or more sampling positions. Alternatively, a sampling position may correspond to one or more pixels or texels in the render output. The render output may then be divided into however many such regions as are required for the render output size and shape that is being used.

The desired resolution profile for the region may take any desired and suitable form. For example, the desired resolution profile for the region may comprise a constant resolution across the region. Thus, in embodiments, obtaining the desired resolution profile for the region may comprise obtaining a (e.g. single) desired resolution for the region. These embodiments can provide acceptable, e.g. piece-wise, foveated rendering in most use cases.

In other embodiments, the desired resolution profile for the region may comprise a variable resolution across the region. Thus, in these other embodiments, obtaining the desired resolution profile for the region may comprise obtaining plural desired resolutions for the region. A variable resolution for a region may vary linearly or non-linearly, and may vary with respect to a location within the region or may vary with respect to a location within the overall render output. A variable resolution for a region may be substantially matched to the lens distortion correction that the region of the render output may be subject to. These embodiments can, for example, provide for more refined, e.g. continuous, foveated rendering.

The desired resolution profile for a region may be obtained in any desired and suitable way. For example, a resolution for a region may be indicated by a scaling factor provided (e.g. specifically) for that region. A scaling factor for a region may be related (e.g. proportional) to the desired resolution. For example, for rendering a region at the highest or full (foveated) resolution, the scaling factor indicated for the region may be 1. For another example, for rendering a region at half resolution, the scaling factor indicated for the region may be ½. For another example, for rendering a region at a quarter resolution, the scaling factor indicated for the region may be ¼. Other relationships between the scaling factors and the highest or full (foveated) resolution may be used as desired.

In embodiments, a resolution and/or scaling factor for a region may be indicated in a set of plural resolutions and/or scaling factors provided for, and e.g. corresponding respectively to, plural regions of the render output. This can allow each region to be rendered at its own (e.g. different) resolution. Thus, in embodiments, a resolution and/or scaling factor for a region may be obtained from a set of plural resolutions and/or scaling factors provided respectively for, and e.g. corresponding respectively to, the plural regions of the render output.

The set of plural resolutions and/or scaling factors may be provided in any desired and suitable way, e.g. as or in an array of resolutions and/or scaling factors (a "scaling texture") for the render output. The position of the resolution and/or scaling factor for a particular region in the set or array may correspond to the position of that particular region in the render output. This can provide an efficient way to obtain or "look-up" the desired resolution and/or scaling factor for the particular region, e.g. based on the position of that particular region in the render output. Thus, obtaining the desired resolution profile for the region may comprise obtaining a particular scaling factor indicated for the region, e.g. from a set or array of scaling factors (a "scaling texture") for the render output.

The graphics geometry referred to herein can be any suitable and desired graphics geometry that can be defined for rendering a render output. In embodiments, the graphics geometry may comprise graphics primitives, such as simple polygons, such as triangles, quads, lines and/or points. However, the graphics geometry could include other graphics geometry that can be defined, as well as or instead of graphics primitives, as desired.

In embodiments, the scaled graphics geometry to be rendered for the region may be obtained in any desired and suitable way. The graphics processor may, for example, prepare one or more lists of graphics geometry to be processed for the region. The one or more lists of graphics geometry may then be used to identify the graphics geometry to be processed when rendering the region.

A given geometry list may correspond to (may list geometry for) some or all of a region. A given geometry list may correspond to (may list geometry for) one or more (e.g. an integer number of) regions. The advantage of such lists is that they can allow the identification of geometry that is actually present in a given region so as to, e.g., avoid unnecessarily rasterising and/or rendering geometry that is not actually present in a region.

Obtaining the scaled graphics geometry to be rendered for the region may further comprise scaling, in accordance with the desired resolution profile (e.g. the desired resolution and/or scaling factor for the region), graphics geometry indicated (e.g. in a geometry list) for the region. Such scaling may be done as part of a vertex position loading operation, but other arrangements would be possible, if desired.

In these embodiments, the graphics geometry indicated for the region may comprise previously unscaled graphics geometry, which is then appropriately scaled (in accordance with the desired resolution profile, e.g. the desired resolution and/or scaling factor, for the region) to produce the scaled graphics geometry to be rendered for the region. Thus, the graphics geometry indicated for the region may comprise previously unscaled graphics geometry.

The graphics geometry indicated for the region may also or instead comprise previously scaled graphics geometry, which either is used without further scaling (if appropriate for the desired resolution profile) or is appropriately further scaled (in accordance with the desired resolution profile) to produce the scaled graphics geometry to be rendered for the region. Thus, the graphics geometry indicated for the region may comprise previously scaled graphics geometry. In embodiments, the previously scaled graphics geometry may have been scaled during geometry processing (primitive set-up) and/or before tiling (e.g. before producing the one or more geometry lists) is performed for the render output, e.g. prior to obtaining the desired resolution profile for the region in question.

In embodiments, the previously scaled graphics geometry may have been scaled by a previous scaling factor. One or more sets of previously scaled graphics geometry may be provided that have been scaled by (e.g. respective) previous scaling factors. The one or more previous scaling factors may be limited to powers of two, e.g. $½n$, where n is a positive integer. Limiting the previous scaling factors in this way can help to reduce the number of sets of previously scaled graphics geometry that need to be provided, whilst still providing a useful range of previously scaled graphics geometry.

In embodiments, when the scaling factor indicated for a region is equal to or less than a previous scaling factor, the process of obtaining the scaled graphics geometry for the region may make use of a set of previously scaled geometry that was scaled using that previous scaling factor. For example, when the scaling factor indicated for a region is ½, previously scaled graphics geometry that was previously scaled by ½ may be obtained and used without further scaling. For another example, when the scaling factor indicated for a region is ¼, previously scaled graphics geometry that was previously scaled by ½ may be obtained and further scaled, but only further scaled by ½ instead of ¼.

Providing one or more sets of previously scaled graphics geometry can accordingly help to increase the efficiency of obtaining scaled graphics geometry for a region, e.g. by reducing the number of scaling factors that need to be supported during a vertex position loading operation in a given rendering pass. Furthermore, providing one or more sets of previously scaled graphics geometry can help to avoid underutilizing the graphics processor when rendering at very low resolutions, e.g. by allowing a relatively larger subregion of a region to be selected for rendering in respect of that region and thus avoiding a very small subregion being selected for rendering in respect of that region.

For example, in these embodiments, plural rendering passes may be performed in respect of plural respective render outputs that together will represent a frame or image. Each rendering pass for a render output may comprise rendering a part of the frame or image to generate the render output for that rendering pass. The part of the frame or image to be rendered in a rendering pass may comprise a set of one or more regions to be rendered at one or more particular resolutions. For example, a first rendering pass may render a set of one or more regions to be rendered at one or more resolutions within a first resolution range (e.g. full to ½ resolution), a second rendering pass may render a set of one or more other regions to be rendered at one or more resolutions within a second different resolution range (e.g. ½ to ¼ resolution), and so on as desired. Each of the one or more regions to be rendered for a pass may be rendered at its particular resolution by obtaining appropriately scaled geometry (e.g. by obtaining and/or scaling (e.g. previously scaled) geometry indicated for the region) and/or selecting an appropriate subregion of the region to render in respect of that region, e.g. in a manner as described herein in any embodiment. The plural rendering passes can, for example, result in a mipmap having plural layers comprising the respective render outputs from the plural rendering passes, which can then be appropriately sampled in order to output the frame or image, e.g. for display.

In any of the above embodiments, the resolution at which the one or more lists of graphics geometry (e.g. primitive lists) are prepared can be any suitable and desired resolution. It may be the resolution of the highest resolution that will be required (i.e. of the "foveated" region). Thus, in embodiments, the one or more lists of graphics geometry may be prepared at the resolution of the highest resolution that is to be rendered. Accordingly, one or more geometry (primitive) lists may be generated using and at the highest resolution, but then those one or more geometry lists (e.g. lists of primitives) may also be used when rendering at lower resolution. One or more geometry lists at an even higher or lower resolution than the resolution of the highest required resolution, may also or instead be prepared, as desired.

Thus, in any of the above embodiments, a geometry list may be prepared at a given, first (e.g. the highest) resolution, and then that geometry list that was prepared at the first resolution may be used when rendering at the desired resolution for the region in question. The Applicants have recognised in this regard that it can be relatively straight-forward to appropriately scale the geometry prepared at a first resolution to provide appropriate geometry for rendering at another resolution. This then avoids the need, e.g., to prepare too many geometry lists, e.g. one for each different resolution that may be used when performing foveated rendering, and can therefore reduce the processing burden on the graphics processor when performing foveated rendering.

The identification of which geometry is to be processed for a given region (and thus to include in a geometry list for a given region) can be performed in any suitable and desired manner, e.g. using any suitable "tiling" (binning) technique. Thus, for example, exact binning and/or bounding box binding could be used for this process.

The geometry sorting (listing) process may operate on (use) appropriately transformed (vertex shaded) positions for the vertices of the geometry (e.g. primitives) that are to be rendered. Accordingly, before the one or more geometry lists for the regions are generated, the set of geometry to be processed for the render output may be subjected to an appropriate vertex shading operation so as to provide an appropriate set of vertex shaded vertex positions for use then by the geometry sorting (listing) process. This vertex shading may be performed at the resolution that the geometry sorting (tiling) process will be performed at, and the results of that vertex shading then used for preparing the one or more region geometry lists. Again, the vertex shading may be performed at the highest resolution that is required.

Thus, both the vertex position processing (shading) and the geometry list (primitive list) generation process may be performed only once, at a first resolution (e.g. at the highest resolution that is required).

Once the one or more lists of geometry (e.g. primitives) to be processed have been prepared for each region, the one or more geometry lists may be stored for use, e.g. to allow the rendering process to identify which geometry (e.g. primitives) need to be considered (i.e. rendered) for each respective region, when the render output is being rendered. Once the one or more geometry lists for the regions have been prepared at the first resolution (e.g. at the highest resolution that will be required), the so-prepared geometry lists may then be used to render the regions.

The desired resolution for the region may be one of plural different resolutions that may be available for use. There may be a highest resolution, which may correspond to the "foveal" resolution that is to be used at or near a fixation point where the highest resolution of the render output is to be provided. There may then be one or more lower resolutions which may be used away from the fixation point, e.g. towards the periphery of the render output. There could be just two different resolutions, the highest resolution and a lower resolution, available for use. Alternatively, three or more different resolutions may be available for use, e.g. comprising a highest resolution and two or more lower resolutions.

As indicated above, the different resolutions and/or scaling factors available for use may be related to the size of the region, e.g. the number of rows and/or columns of sampling positions for the region. The different resolutions and/or scaling factors available for use may, for example, comprise or consist of (vulgar or proper) fractions having a denominator equal to the number of rows and/or columns of sampling positions for the region. For example, for a region that is 16×16 sampling positions in size, the different resolutions and/or scaling factors available for use may comprise or consist of 16/16 (i.e. 1), 15/16, 14/16, and so on down to 1/16. In other embodiments, the different resolutions and/or scaling factors available for use may be limited to a subset of such fractions. For example, the different resolutions and/or scaling factors available for use may be limited to fractions having an even numerator and/or denominator. This can help to improve the efficiency of the graphics processing system and can reduce the number of different resolutions and/or scaling factors that need to be supported. In other embodiments, the different resolutions and/or scaling factors available for use may be limited to powers of two, e.g. $1/2n$, where n is a positive integer. Again, this can further help to improve the efficiency of the graphics processing system and can further reduce the number of scaling factors that need to be supported.

The selection of which resolution is to be used for any given region in the overall render output can be performed and indicated as desired, e.g. in the manner that is used for the graphics processor and the graphics processing system in question when performing foveated rendering. For example, appropriate head tracking or eye/gaze tracking information could be used to identify which resolution should be displayed where in the render output, and/or, in the case of virtual reality head-mounted displays, the centre of the render output could be identified and indicated as the region where a higher (e.g. the highest) resolution should be displayed, with regions towards the periphery of the render output then being displayed at lower resolutions.

The desired resolution for a region may be provided at any suitable and desired time, e.g. before the appropriately scaled graphics geometry is to be obtained for rendering and/or before an appropriate subregion is to be selected for rendering in respect of the region. In embodiments in which the scaling factor for the region is dynamic, e.g. a fixation point is determined by head or eye/gaze tracking, the desired resolution profile for the region may be provided after geometry processing and/or tiling (e.g. after producing the one or more geometry lists) for the region and/or immediately before the appropriately scaled graphics geometry is obtained for rendering and/or immediately before an appropriate subregion is selected for rendering in respect of the region. This can help to reduce the latency between a fixation point being determined and performing rendering in respect of a region.

The subregion to be rendered in respect of the region may be selected in any desired and suitable way. For example, selecting the subregion to be rendered in respect of the region may comprise selecting some but not all of the region in question. The size of the selected subregion, e.g. in terms of sampling positions, may be based on the desired resolution and/or scaling factor for the region. For example, when rendering at half resolution, a subregion comprising ¼ of the region (e.g. comprising ½ the rows and ½ the columns of sampling positions) may be selected for rendering. For another example, when rendering at a quarter resolution, a subregion comprising ¹⁄₁₆ of the region (e.g. comprising ¼ of the rows and ¼ of the columns of sampling positions) may be selected for rendering. Other sized subregions may be selected for rendering at other resolutions as appropriate. In other cases, such as full resolution rendering, the entire region may be selected for rendering.

The selected subregion may comprise a contiguous subregion. The selected subregion may be adjacent to one or more (e.g. two) edges of the region, such as an upper edge and a left edge of the region. The location of the one or more edges may be the same for each region to be rendered in the manner of the technology described herein (e.g. the selected subregions may always be adjacent to the upper and left edges of their respective regions). This can provide consistent handling of plural regions that are to be rendered in the manner of the technology described herein.

Similarly, selecting the subregion to be rendered in respect of the region may comprise not selecting some of the render output for rendering. The size or area of the unselected region, e.g. in terms of sampling positions, may again be based on the desired resolution and/or scaling factor for the region. For example, when rendering at half resolution, an unselected subregion comprising ¾ of the region may not be selected for rendering. For another example, when rendering at a quarter resolution, an unselected subregion comprising ¹⁵⁄₁₆ of the region may not be selected for rendering. Other sized areas may not be selected for rendering for other resolutions as appropriate.

The unselected subregion may again comprise a contiguous area of the region. The unselected subregion may be adjacent one or more (e.g. two) other edges of the region, such as a lower edge and a right edge of the region. The location of the one or more other edges may again be the same for each region to be rendered in the manner of the technology described herein (e.g. the unselected subregions may always be adjacent to the lower and right edges of their respective regions). Again, this can provide consistent handling of plural regions to be rendered in the manner of the technology described herein.

Thus, selecting the subregion to be rendered in respect of the region may comprise selecting one or more (but not all of the) rows and/or one or more (but not all of the) columns of sampling positions of the region at which to perform rendering in respect of the region. Performing rendering in respect of the region may then comprise performing rendering in respect of the selected one or more rows and/or one or more columns of sampling positions.

Similarly, selecting a subregion to be rendered in respect of the region may comprise not selecting one or more rows and/or one or more columns of sampling positions of the region for rendering in respect of the region. Performing rendering in respect of the region may then comprise not performing rendering in respect of the unselected one or more rows and/or one or more columns of sampling positions. For example, either no rendering at all may be performed in respect of the unselected one or more rows and/or one or more columns of sampling positions (e.g. no rendering execution threads are spawned), or only partial rendering may be performed in respect of the unselected one or more rows and/or one or more columns of sampling positions (e.g. rendering execution threads may be spawned but may be terminated before completion).

As indicated above, the selected one or more rows and/or selected one or more columns of sampling positions for the region may comprise one or more rows and/or one or more columns of sampling positions that are adjacent to one another and thus form a contiguous selected subregion of sampling positions to be rendered. As is also indicated above, the selected one or more rows and/or one or more columns of sampling positions may be adjacent to one or more edges of the region, such as an upper edge and/or a left edge of the region. These embodiments can provide for efficient compression of the resultant output array of data elements by allowing the rendered data elements to be grouped together. Similarly, as indicated above, the unselected one or more rows and/or unselected one or more columns of sampling positions for the region may comprise one or more rows and/or one or more columns of sampling positions that are adjacent to one another and thus form a contiguous unselected subregion of sampling positions not to be rendered. Similarly, the unselected one or more rows and/or unselected one or more columns of sampling positions for the region may be adjacent to one or more other edges of the region, such as a lower edge and/or a right edge of the region. These embodiments can also provide for efficient compression of the resultant output array of data elements by allowing unrendered data elements to be grouped together.

The selected one or more rows and/or one or more columns of sampling positions may comprise any desired and suitable (e.g. integer) number of rows and/or columns of sampling positions. As indicated above, the number of selected rows and/or columns may be based on the desired resolution and/or scaling factor for the region. For example, when rendering at half resolution, ½ of the rows and/or ½ of the columns may be selected for rendering. For another example, when rendering at a quarter resolution, a ¼ of the rows and/or a ¼ of the columns may be selected for rendering. Other numbers of rows and/or columns may be selected for rendering at other resolutions as appropriate.

Similarly, the unselected one or more rows and/or one or more columns of sampling positions for the region may also comprise any desired and suitable number of rows and/or columns, e.g. that is equal to the number of rows and/or columns of sampling positions for the region minus the number of selected rows and/or columns of sampling positions. The number of unselected rows and/or columns may accordingly also be based on the desired resolution and/or scaling factor. For example, when rendering at half resolution, ½ of the rows and/or ½ of the columns may not be rendered. For another example, when rendering at a quarter resolution, ¾ of the rows and/or ¾ of the columns may not be rendered.

The number of selected rows may be substantially equal to the number of selected columns, e.g. for uniform or isotropic scaling and/or for a square region of the render output. Alternatively, the number of selected rows may be different to the number of selected columns, e.g. for non-uniform or anisotropic scaling and/or for a non-square region of the render output. Similarly, the number of unselected rows may be substantially equal to the number of unselected columns, e.g. for uniform or isotropic scaling and/or for a square region. Alternatively, the number of unselected rows may be different to the number of unselected columns, e.g. for non-uniform or anisotropic scaling and/or for a non-square region.

To render a given region of a render output, the graphics processor may process the scaled geometry accordingly, for example by rasterising the scaled geometry (e.g. primitives) to graphics fragments for the (sampling positions of the) selected subregion and then rendering the graphics fragments to provide output rendered data elements for the subregion.

Thus, embodiments may further comprise performing rasterising in respect of the region, wherein performing rasterising in respect of the region comprises rasterising the scaled graphics geometry to generate graphics fragments for the selected subregion of the render output. Performing rasterising in respect of the region may also comprise not generating graphics fragments for the unselected subregion of the render output. Performing rendering in respect of the region may then comprise rendering the generated graphics fragments for the subregion.

The rendering process can be performed in any desired and suitable manner, e.g. depending upon the nature of the graphics processor in question. The rendering process can include any processing that the graphics processor or a graphics processing pipeline may perform when rendering geometry for output (e.g. for display), such as performing hidden surface removal operations, depth testing, stencil testing, blending, texture mapping, etc.

The resultant output array of data elements may be any desired and suitable size in terms of data elements. In some embodiments, the output array of data elements may be the same size in terms of data elements as would have been the case had the entire region been rendered. This can allow rendering of the region in the manner of the technology described herein to be substantially transparent to subsequent processing stages, such as storage, compression, etc. of the output array of data elements.

In these embodiments, the output array of data elements may be padded with data elements, such as one or more padding rows and/or columns of data elements, e.g. such that the output array of data elements is substantially the same size in terms of data elements as would have been the case had the entire region been rendered. In effect, the padding data elements (e.g. one or more padding rows and/or columns of data elements) can take the place of the data elements that would have been generated for the unselected subregion of the render output that was not rendered.

Thus, embodiments may comprise padding the output array of data elements with one or more rows and/or one or more columns of data elements that correspond to sampling positions that have not been rendered in respect of the region. The padding data elements may represent substantially uniform data. As will be discussed in more detail below, this can allow for efficient compression of the output array of data elements since uniform data tends to compress well using many compression schemes.

In other embodiments, the subregion of data elements may be upscaled such that the upscaled subregion of data elements is substantially the same size in terms of data elements as the region would have been had the entire region been rendered. The output array of data elements may then comprise the upscaled subregion of data elements. The upscaling may comprise nearest neighbour interpolation. In these embodiments, the scaling factors available for use may be limited to powers of two, e.g. $1/2^n$ where n is a positive integer. Again, as will be discussed in more detail below, this can allow for efficient compression of the output array of data elements since neighbouring data elements will tend to represent the same data and thus will tend to compress well using many compression schemes.

The resultant output array of data elements can be used as desired. For example, the output array of data elements may be combined with one or more other output arrays of data elements generated for other regions of the render output (e.g. to form the overall render output, such as a render output that represents a texture or frame for display) and/or may be stored for later use (as an, e.g. compressed, render output that represents a texture or image) and/or (e.g. processed for) output for display. The region and/or render output may, for example, be stored in a framebuffer in system memory for later use.

Embodiments may further comprise compressing the output array of data elements and/or render output, e.g. prior to storing the output array of data elements and/or render output for later use. In this regard, as indicated above, the Applicants have identified that the output array of data elements generated in the embodiments will tend to compress well because that array can have one or more contiguous subregions of data elements that represent substantially uniform data. Such subregions of substantially uniform data tend to compress well using many compression schemes.

The output array and/or render output may be compressed using any desired and suitable compression scheme. The compression scheme may, for example, comprise an image or graphics (texture) compression scheme. The compression scheme may, for example, allow random access into the resultant compressed data, e.g. without the need to decompress the entire compressed array of data elements. The compression scheme may, for example, comprise a block-based compression scheme. The compression scheme may further allow random access into the encoded data for a block, e.g. without the need to decompress the encoded data for the entire block. In embodiments, the compression scheme may be substantially lossless (e.g. the precision of the original data elements can substantially be recovered when decompressing the data). In embodiments, the compression scheme may comprise a compression scheme substantially as described in US 2013/0034309 or US 2013/0195352, the entire contents of which are incorporated herein by reference. The compression scheme may, for example, comprise Arm Frame Buffer Compression (AFBC).

In embodiments, one or more data values for one or more sampling positions may later be sampled and/or derived from the (e.g. compressed) output array of data elements for a region. The process of sampling and/or deriving one or more data values may comprise reading in some or all of the data for the (e.g. compressed) output array of data elements for the region, e.g. from memory. The process of sampling and/or deriving one or more data values may further comprise decompressing some or all of the data for the compressed output array of data elements for the region.

The process of sampling and/or deriving one or more data values may further comprise upscaling the (e.g. decompressed or uncompressed) output array of data elements for the region. However, as will be discussed in more detail below, in embodiments, the process of sampling and/or deriving one or more data values does not comprise decompressing and/or upscaling the (e.g. compressed, decompressed or uncompressed) output array of data elements for the region. Instead, the (e.g. compressed, decompressed or uncompressed) output array of data elements for the region may be sampled directly.

In order to facilitate the process of sampling and/or deriving a data value for a sampling position from an (e.g. compressed, decompressed or uncompressed) output array of data elements, the resolution profile (e.g. resolution and/or scaling factor) used when rendering the region in question may be indicated for (and e.g. stored together with) the (e.g. compressed, decompressed or uncompressed) output array of data elements. The resolution profile (e.g. resolution and/or scaling factor) may be indicated in any desired and suitable way. For example, the resolution profile (e.g. resolution and/or scaling factor) may be indicated in metadata provided with (e.g. in a header for) the (e.g. compressed, decompressed or uncompressed) output array of data elements for the region.

The resolution profile (e.g. resolution and/or scaling factor) may then be read in and a resolution and/or scaling factor used when sampling and/or deriving the data value in question. A resolution and/or scaling factor may, for example, be used to appropriately upscale the (e.g. decompressed or uncompressed) output array of data elements for the region. However, in embodiments, a resolution and/or scaling factor may be used to appropriately map a sampling position that is being used to sample the (e.g. compressed, decompressed or uncompressed) output array of data elements for the region.

Thus, embodiments may further comprise sampling and/or deriving a data value for a sampling position from the output array of data elements corresponding to a region of the render output. Sampling and/or deriving the data value for the sampling position may comprise mapping the sampling position to a mapped sampling position based on a particular resolution at which the region was rendered and using the mapped sampling position to sample and/or derive the data value for the sampling position. These embodiments can, for example, allow the data value to be sampled and/or derived directly from the output array of data elements, e.g. without first needing to decompress and/or upscale the entire output array of data elements. This in turn can reduce the amount of bandwidth and processing required to sample and/or derive the data value by avoiding the need to read in and process the entire output array of data elements in order to sample and/or derive the data value.

In any of the embodiments described herein, the process of sampling and/or deriving one or more data values may be performed by the graphics processor (e.g. by a texture mapper of the graphics processor) and/or by another suitable data processor, such as a display processor.

Thus, another embodiment of the technology described herein comprises a method of operating a data processor comprising:
 sampling and/or deriving a data value for a sampling position from an output array of data elements corresponding to a region of a render output, wherein the region is one of plural regions into which the render output was divided for rendering purposes, wherein sampling and/or deriving the data value for the sampling position comprises:
  mapping the sampling position to a mapped sampling position based on a particular resolution at which the region was rendered; and
  using the mapped sampling position to sample and/or derive the data value for the sampling position.

Similarly, another embodiment of the technology described herein comprises a data processor comprising:
 a sampling circuit configured to sample and/or derive a data value for a sampling position from an output array of data elements corresponding to a region of a render output, wherein the region is one of plural regions into which the render output was divided for rendering purposes, wherein sampling and/or deriving the data value for the sampling position comprises:
  a sampling position mapping circuit configured to mapping the sampling position to a mapped sampling position based on a particular resolution at which the region was rendered; and
  a data value deriving circuit configured to using the mapped sampling position to sample and/or derive the data value for the sampling position.

These embodiments may comprise any one or more or all of the features described herein in any other embodiment, as desired. For example, the process of sampling and/or deriving one or more data values may be performed by the graphics processor (e.g. by a texture mapper of the graphics processor) and/or by another suitable data processor, such as a display processor.

For another example, the output array of data elements for the region that is being sampled may be compressed, decompressed or uncompressed. The output array and/or render output may be compressed using any desired and suitable compression scheme. The compression scheme may, for example, comprise an image or graphics (texture) compression scheme. The compression scheme may, for example, allow random access into the resultant compressed data, e.g. without the need to decompress the entire compressed array of data elements. The compression scheme may, for example, comprise a block-based compression scheme. The compression scheme may further allow random access into the encoded data for a block, e.g. without the need to decompress the encoded data for the entire block. In embodiments, the compression scheme may be substantially lossless (e.g. the precision of the original data elements can substantially be recovered when decompressing the data). In embodiments, the compression scheme may comprise a compression scheme substantially as described in US 2013/0034309 or US 2013/0195352, the entire contents of which are incorporated herein by reference. The compression scheme may, for example, comprise Arm Frame Buffer Compression (AFBC).

For another example, the process of sampling and/or deriving the data value may not comprise decompressing and/or upscaling the (e.g. compressed, decompressed or uncompressed) output array of data elements for the region. Thus, in embodiments, the (e.g. compressed, decompressed or uncompressed) output array of data elements for the region may be sampled directly using the mapped sampling position.

For another example, in order to facilitate the process of sampling and/or deriving the data value for the sampling position from the (e.g. compressed, decompressed or uncompressed) output array of data elements, the resolution profile (e.g. resolution and/or scaling factor) used when rendering the region in question may be indicated for (and e.g. stored together with) the (e.g. compressed, decompressed or uncompressed) output array of data elements. The resolution profile (e.g. resolution and/or scaling factor) may be indicated in any desired and suitable way. For example, the resolution profile (e.g. resolution and/or scaling factor) may be indicated in metadata provided with (e.g. in a header for) the (e.g. compressed, decompressed or uncompressed) output array of data elements for the region.

The resolution profile (e.g. resolution and/or scaling factor) may then be read in and a resolution and/or scaling factor used when sampling and/or deriving the data value in question. In particular, a resolution and/or scaling factor may be used to appropriately map the sampling position that is being used to sample the (e.g. compressed, decompressed or uncompressed) output array of data elements for the region.

A data value sampled and/or derived in the manner of the above embodiments may be used as desired. For example, a sampled and/or derived data value may be combined with one or more other sampled and/or derived data values and/or may be used for further rendering (e.g. as a texture value) and/or further processed for output (e.g. for display).

As will be appreciated, one or more data values may be sampled and/or derived for the sampling position in the manner of the technology described herein. Similarly, one or more data values may be sampled and/or derived for each one of plural sampling positions in the manner of the technology described herein. Similarly, one or more data values may be sampled and/or derived for each one of plural respective output arrays of data elements (e.g. of one or more render outputs) in the manner of the technology described herein.

Although the technology described herein has been described above with particular reference to rendering a given region of the render output, as will be appreciated, in practice, plural regions may be rendered at respective resolutions in the manner of the technology described herein to generate respective output arrays of data elements (e.g. of one or more render outputs).

Similarly, although the technology described herein has been described above with particular reference to the generation of different resolution regions representing a given render output, as will be appreciated, in practice, this process may be repeated for plural render outputs, e.g. for a sequence of successive output frames that are to be displayed using foveated rendering.

Correspondingly, where the render outputs are for virtual reality displays (and thus comprise rendering plural different render outputs for a scene from plural different viewpoints, such as a "left eye" view, and a "right eye" view for stereoscopic rendering (in which two images of a scene, one corresponding to the scene as seen from the left eye, and one corresponding to the scene as seen from the right eye, are generated, and then displayed appropriately so as to provide a three-dimensional effect when the images are viewed)), each different render output, e.g. both the left and right eye images, may be rendered using foveated rendering in the manner of the technology described herein.

As will be appreciated from the above, the technology described herein relates to the operation of the graphics processor when performing foveated rendering. Thus, in an embodiment, it may first be recognised that the graphics processor is to perform foveated rendering, and then the operation in the manner of the technology described herein may be triggered accordingly.

It can be recognised (determined) when the graphics processor is to perform foveated rendering in any suitable and desired manner. In an embodiment, this may be determined from information, such as state information and/or metadata, associated with the graphics processing task or tasks that are to be executed by the graphics processor, e.g. that are being provided by an application that requires graphics processing, e.g., that indicates that foveated rendering is required. For example, an application that requires graphics processing by the graphics processor may provide an indication, when it requests the graphics processing operations, that foveated rendering is to be performed.

In an embodiment, the fact that foveated rendering is to be performed is indicated by means of a function call that an application requiring the graphics rendering can be used to indicate that such rendering is required. Thus, an application may indicate, e.g. via a function call, that the geometry is to be rendered to multiple resolutions.

When it is recognised that the graphics processor is to perform foveated rendering, the operation of the graphics processor in the manner of the technology described herein can be triggered in any suitable and desired manner (the graphics processor can be configured to operate in the manner of the technology described herein in any suitable and desired manner).

In an embodiment, the driver for the graphics processor indicates to the graphics processor (issues commands to the graphics processor) to perform foveated rendering in the manner of the technology described herein. Correspondingly, any shading programs, such as vertex shading and/or fragment shading programs to be executed by the graphics processor when rendering the render output may be configured appropriately. This may be done by the compiler for the graphics processor (for any shaders of the graphics processor) (by compiler processing circuit/circuitry for the graphics processing system). The compiler may execute on the host processor of the graphics processing system, e.g. that the application that is requesting the graphics processing executes on, e.g. as part of a driver for the graphics processing pipeline that executes on the host processor. Other arrangements would be possible, if desired.

As will be appreciated from the above, the graphics processor may be part of an overall graphics processing system that includes a host processor that executes applications that can require graphics processing by the graphics processor. The host processor may send appropriate commands and data to the graphics processor to control it to perform graphics processing operations and to produce graphics processing (render) outputs required by applications executing on the host processor (including in the manner of the technology described herein). To facilitate this, the host processor may execute a driver for the graphics processor and a compiler or compilers for compiling shader programs to be executed by programmable shading stages of the graphics processor (which compiler may be a part of the driver).

Thus, the graphics processor may be in communication with a host processor (that is part of the overall graphics processing system) that executes a driver for the graphics processor and/or a compiler or compilers for the graphics processor. The graphics processor and/or host processor may also in communication with a display processor and/or a display for displaying frames or images generated by the graphics processor (thus the graphics processing system may further comprise a display processor and/or a display for displaying the frames or images generated by the graphics processor).

Similarly, the graphics processing system may have and/or may be in communication with a display processor and/or a display for displaying frames or images generated by the graphics processor, and/or has or is in communication with a system memory in which render outputs generated by the graphics processor may be stored, e.g. for subsequent processing, e.g. display. Similarly, there is in an embodiment an application on the host processor that indicates a requirement for performing foveated rendering, which requirement is then recognised by, e.g., a driver executing on, the host processor, with the, e.g. driver on, the host processor then operating to instruct the graphics processor to perform rendering accordingly.

As well as the elements and stages described above, the graphics processor can otherwise include any one or more or all of the other processing stages that a graphics processor can normally include. Thus, for example, the graphics processor may include a primitive setup stage, a rasteriser and/or a renderer. In embodiments the renderer may be in the form of or include a programmable fragment shader.

The graphics processor may also comprise a tile buffer for storing tile sample values and/or a write out unit that operates to write the data elements in the tile buffer (e.g. once the data in the tile buffer is complete) out to external (main) memory (e.g. to a frame buffer).

The graphics processor may comprise one or more programmable shading stages, such as one or more or all of a vertex shading stage, a hull shader, a tessellation stage (e.g. where tessellation is performed by executing a shader program), a domain (evaluation) shading stage (shader), a geometry shading stage (shader), and a fragment shader.

The graphics processor may also contain any other suitable and desired processing stages that a graphics processor may contain such as a depth (or depth and stencil) tester(s), a blender, a write out unit, etc.

Any programmable shading stages of the graphics processing pipeline such as the vertex shader, fragment shader, etc., can be implemented as desired and in any suitable manner, and can perform any desired and suitable shading, e.g. vertex shading, fragment shading, etc., functions, respectively and as appropriate.

Each programmable processing stage (shader) may comprise any suitable programmable hardware element such as programmable processing circuit/circuitry. Each programmable processing stage (shader) may be provided as a separate circuit element to other programmable stages (shaders) of the processing pipeline or the programmable processing stages may share some or all of their programmable processing circuit/circuitry (that is then differently programmed to serve as the desired programmable processing stage (shader)).

In embodiments, the data (e.g. graphics and/or display) processor may comprise, and/or may be in communication with, one or more memories and/or memory devices that store the data described herein, and/or that store software for performing the processes described herein.

In embodiments, the various functions of the technology described herein may be carried out on a single graphics processing platform that generates and outputs the rendered fragment data that is, e.g., written to a frame buffer for a display device.

The technology described herein may be implemented in any suitable system, such as a suitably configured microprocessor based system. In some embodiments, the technology described herein is implemented in computer and/or micro-processor based system.

The technology described herein is in an embodiment implemented in a portable device, such as a mobile phone or tablet. It is believed that the technology described herein would be particularly applicable to devices where foveated rendering will be required, such as for virtual reality display devices such as virtual reality headsets.

Thus, another embodiment of the technology described herein comprises a virtual reality display device comprising the graphics processor, data processor or system of any one or more of the embodiments of the technology described herein. Correspondingly, another embodiment of the technology described herein comprises a method of operating a virtual reality display device, comprising operating (e.g. a graphics processor, data processor or system of) the virtual reality display device in the manner of any one or more of the embodiments of the technology described herein.

The various functions of the technology described herein can be carried out in any desired and suitable manner. For example, the functions of the technology described herein can be implemented in hardware or software, as desired. Thus, for example, the various functional elements, stages and "means" of the technology described herein may comprise a suitable processor or processors, controller or controllers, functional units, circuits/circuitry, processing logic, microprocessor arrangements, etc., that are operable to perform the various functions, etc., such as appropriately dedicated hardware elements (processing circuit/circuitry) and/or programmable hardware elements (processing circuit/circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuit/circuitry, etc., if desired.

It will also be appreciated by those skilled in the art that all of the described embodiments of the technology described herein can include, as appropriate, any one or more or all of the features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising software code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processor, renderer, data processor, or other system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, either over a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

A number of embodiments of the technology described herein will now be described in the context of the processing of computer graphics for display.

FIG. 1 shows a computer graphics processing system 100. An application 102, such as a game, executing on a host processor 104 will require graphics processing operations to be performed by an associated graphics processor (graphics processing unit (GPU)) 106. To do this, the application will generate API (Application Programming Interface) function calls that are interpreted by a driver 108 for the graphics processor 106 that is running on the host processor 104 to generate appropriate commands to the graphics processor 106 to generate graphics output required by the application 102. To facilitate this, a set of commands will be provided to the graphics processor 106 in response to commands from the application 102 running on the host processor 104 for graphics output (e.g. to generate a frame to be displayed).

Figure 2:
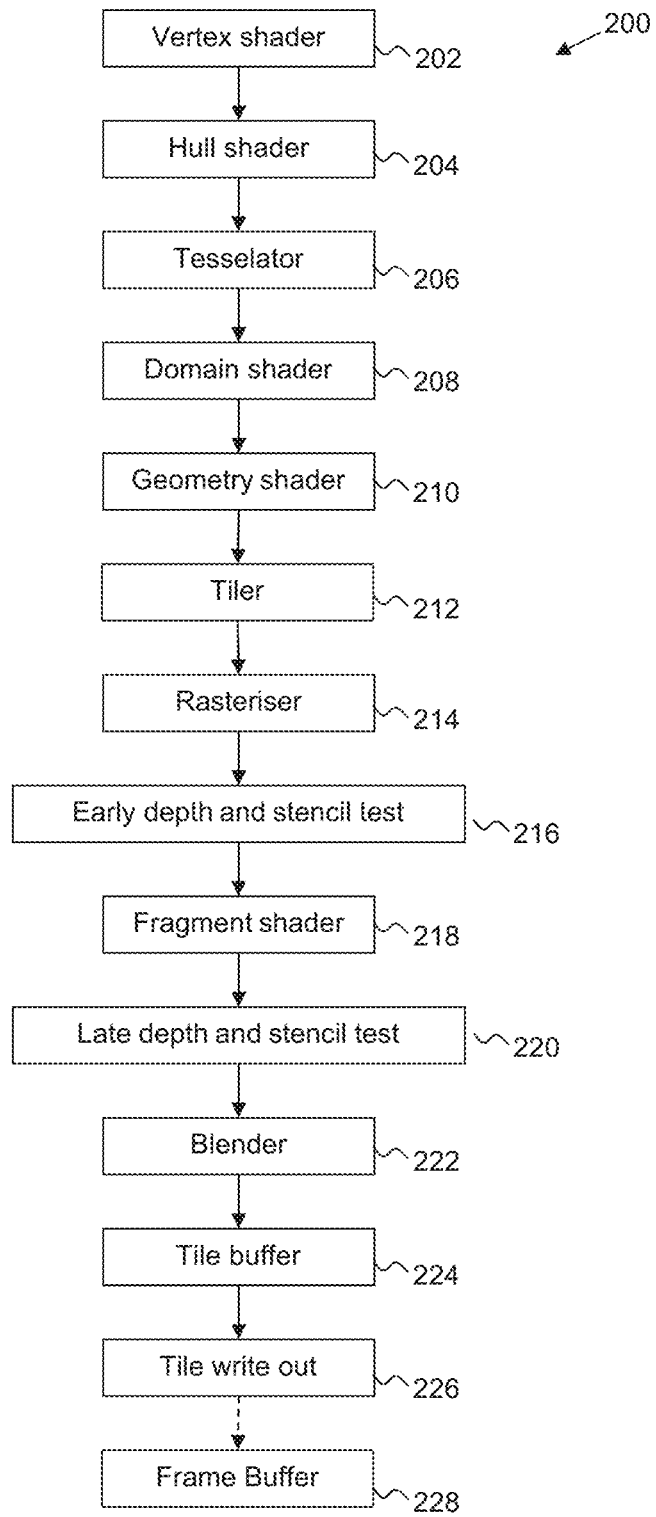
FIG. 2 shows a graphics processing pipeline that can be implemented by a graphics processor according to an embodiment of the technology described herein.

FIG. 2 shows a graphics processing pipeline 200 that can be implemented by the graphics processor 106 of the present embodiment in more detail.

The graphics processor 106 of the present embodiment is a tile-based renderer and will thus produce tiles of a render output data array, such as an output frame to be generated. The render output data array may be an output frame intended for display on a display device, such as a screen or printer, but may also, for example, comprise intermediate data intended for use in later rendering passes (also known as a "render to texture" output), etc.

In tile-based rendering, rather than the entire render output, e.g., frame, effectively being processed in one go as in immediate mode rendering, the render output, e.g., frame to be displayed, is divided into a plurality of smaller regions (areas), usually referred to as "tiles". Each tile (region) is rendered separately (typically one-after-another), and the rendered tiles (regions) are then recombined to provide the complete render output, e.g., frame for display. In such arrangements, the render output is typically divided into regularly-sized and shaped regions (tiles) (which are usually, e.g., squares or rectangles), but this is not essential.

When a computer graphics image is to be displayed, it is usually first defined as a set of graphics geometry, typically a series of primitives (polygons), which graphics geometry (e.g. primitives) is then divided (rasterised) into graphics fragments for graphics rendering in turn. During a normal graphics rendering operation, the renderer will modify the (e.g.) colour (red, green and blue, RGB) and transparency (alpha, a) data associated with each fragment so that the fragments can be displayed correctly. Once the fragments have fully traversed the renderer, then their associated data values are stored in memory, ready for output, e.g. for display.

FIG. 2 shows the main elements and pipeline stages of the graphics processor 106 that are relevant to the operation of the present embodiment. As will be appreciated by those skilled in the art there may be other elements and stages of the graphics processor 106 (graphics processing pipeline 200) that are not illustrated in FIG. 2.

It should also be noted here that FIG. 2 is only schematic, and that, for example, in practice the shown functional units and pipeline stages may share significant hardware circuits, even though they are shown schematically as separate stages in FIG. 2. It will also be appreciated that each of the stages, elements and units, etc., of the graphics processing pipeline 200 as shown in FIG. 2 may be implemented as desired and will accordingly comprise, e.g., appropriate circuits/circuitry and/or processing logic, etc., for performing the necessary operation and functions.

As shown in FIG. 2, the graphics processing pipeline 200 that the graphics processor 106 executes includes a number of stages, including vertex shader 202, a hull shader 204, a tesselator 206, a domain shader 208, a geometry shader 210, a tiler 212, a rasterisation stage 214, an early Z (depth) and stencil test stage 216, a renderer in the form of a fragment shading stage 218, a late Z (depth) and stencil test stage 220, a blending stage 222, a tile buffer 224 and a downsampling and writeout (multisample resolve) stage 226.

The vertex shader 202 takes the input data values associated with the vertices, etc., defined for the output to be generated, and processes those data values to generate a set of corresponding "vertex shaded" output data values for use by subsequent stages of the graphics processing pipeline 200.

Each primitive to be processed is usually defined by and represented as a set of vertices. Each vertex for a primitive typically has associated with it a set of "attributes", i.e. a set of data values for the vertex. These attributes will typically include position data and other, non-position data (varyings), e.g. defining colour, light, normal, texture coordinates, etc., for the vertex in question.

For a given output to be generated by the graphics processor 106, there will typically be a set of vertices defined for the output in question. The primitives to be processed for the output will then be indicated as comprising given vertices in the set of vertices for the graphics processing output being generated.

The vertex shading operation operates to transform the attributes for each vertex into a desired form for the subsequent graphics processing operations. This may comprise, for example, transforming vertex position attributes from the world or user space that they are initially defined for to the screen space that the output of the graphics processing system is to be displayed in, modifying the input data to take account of the effect of lighting in the image to be rendered, etc.

The hull shader 204 performs operations on sets of patch control points and generates additional data known as patch constants. The tessellation stage 206 subdivides geometry to create higher-order representations of the hull, and the domain shader 208 performs operations on vertices output by the tessellation stage (similar to a vertex shader). The geometry shader 210 processes entire primitives such as a triangles, points or lines.

These stages together with the vertex shader 202 effectively perform all the necessary fragment frontend operations, such as transformation and lighting operations, and primitive setup, to setup the geometry to be rendered, in response to commands and vertex data provided to the graphics processor 106.

Once all the primitives to be rendered have been appropriately set up, the tiler 212 then determines which primitives need to be processed for each tile that the render output has been divided into for processing purposes. To do this, the tiler 212 compares the location of each primitive to be processed with the tile positions, and adds the primitive to a respective geometry (primitive) list for each tile that it determines the primitive could (potentially) fall within. Any suitable and desired technique for sorting and binning primitives into tile lists, such as exact binning, or bounding box binning or anything in between, can be used for the tiling process.

Once lists of geometry (primitives) to be rendered (primitive-lists) have been prepared for each rendering tile in this way, the primitive-lists are stored for use, e.g., to allow the system to identify which primitives need to be considered (and rendered) when the tile in question is rendered.

Once the tiler 212 has completed the preparation of the tile lists (lists of primitives to be processed for each tile), then each tile can be rendered.

To do this, each tile is processed by the graphics processing pipeline 200 stages shown in FIG. 2 that follow the tiler 212.

Thus, when a given tile is being processed, each primitive that is to be processed for that tile (that is listed in a tile list for that tile) is passed to the rasteriser 214.

The rasterisation stage 214 of the graphics processing pipeline 200 operates to rasterise the primitives into individual graphics fragments for processing. To do this, the rasteriser 214 rasterises the primitives to sampling points and generates graphics fragments having appropriate positions (representing appropriate sampling positions) for rendering the primitives.

The fragments generated by the rasteriser 214 are then sent onwards to the rest of the pipeline for processing.

The early Z/stencil stage 216 performs a Z (depth) test on fragments it receives from the rasteriser 214, to see if any fragments can be discarded (culled) at this stage. To do this, it compares the depth values of (associated with) fragments issuing from the rasteriser 214 with the depth values of fragments that have already been rendered (these depth values are stored in a depth (Z) buffer that is part of the tile buffer 224) to determine whether the new fragments will be occluded by fragments that have already been rendered (or not). At the same time, an early stencil test is carried out.

Fragments that pass the fragment early Z and stencil test stage 216 are then sent to the fragment shading stage 218. The fragment shading stage 218 performs the appropriate fragment processing operations on the fragments that pass the early Z and stencil tests, so as to process the fragments to generate the appropriate rendered fragment data.

This fragment processing may include any suitable and desired fragment shading processes, such as executing fragment shader programs on the fragments, applying textures to the fragments, applying fogging or other operations to the fragments, etc., to generate the appropriate fragment data. In the present embodiment, the fragment shading stage 218 is in the form of a shader pipeline (a programmable fragment shader).

There is then a "late" fragment Z and stencil test stage 220, which carries out, inter alia, an end of pipeline depth test on the shaded fragments to determine whether a rendered fragment will actually be seen in the final image. This depth test uses the Z-buffer value for the fragment's position stored in the Z-buffer in the tile buffer 224 to determine whether the fragment data for the new fragments should replace the fragment data of the fragments that have already been rendered, by comparing the depth values of (associated with) fragments issuing from the fragment shading stage 218 with the depth values of fragments that have already been rendered (as stored in the depth buffer). This late fragment depth and stencil test stage 220 also carries out any necessary "late" alpha and/or stencil tests on the fragments.

The fragments that pass the late fragment test stage 220 are then subjected to, if required, any necessary blending operations with fragments already stored in the tile buffer 224 in the blender 222. Any other remaining operations necessary on the fragments, such as dither, etc. (not shown) are also carried out at this stage.

Finally, the (blended) output fragment data (values) are written to the tile buffer 224 from where they can, for example, be output to a frame buffer 228 for later display. The depth value for an output fragment is also written appropriately to a Z-buffer within the tile buffer 224. The tile buffer 224 thus stores colour and depth buffers that store an appropriate colour, etc., or Z-value, respectively, for each sampling point that the buffers represent (in essence for each sampling point of a tile that is being processed). These buffers store an array of fragment data that represents a region (a tile) of the overall render output (e.g. image to be displayed), with respective sets of sample values in the buffers corresponding to respective pixels of the overall render output (e.g. each 2×2 set of sample values may correspond to an output pixel, where 4× multisampling is being used). The tile buffer is provided as part of RAM that is located on (local to) the graphics processing pipeline (chip).

The data from the tile buffer 224 is input to a downsampling (multisample resolve) writeout unit 226, and thence output (written back) to an external memory output buffer, such as a frame buffer 228 of a display device (not shown). The display device could be provided with data for display by a display processor (not shown) and could comprise, e.g., a display comprising an array of pixels, such as a computer monitor or a printer.

The downsampling and writeout unit 226 downsamples the fragment data stored in the tile buffer 224 to the appropriate resolution for the output buffer (device) (i.e. such that an array of pixel data corresponding to the pixels of the output device is generated), to generate output data elements (for pixels) for output to the output buffer. In this regard, each region (tile) may be provided with a respective multisample (multisample anti-aliasing or "MSAA") setting. For example, either no multisampling or (e.g. 2×, 4×, 8×, 16×, etc.) multisampling may be used for a given region (tile). Regions (tiles) that require higher resolution rendering may, for example, be rendered with a higher level of multisampling (i.e. a greater number of sampling points per output pixel).

Once a tile of the render output has been processed and its data exported to a main memory (e.g. to a frame buffer 228 in a main memory) for storage, the next tile is then processed, and so on, until sufficient tiles have been processed to generate the entire render output (e.g. frame (image) to be displayed). The process is then repeated for the next render output (e.g. frame) and so on.

As can be seen from FIG. 2, the graphics processing pipeline 200 includes a number of programmable processing or "shader" stages, namely the vertex shader 202, hull shader 204, domain shader 208, geometry shader 210, and the fragment shader 218. These programmable shader stages execute respective shader programs that have one or more input variables and generate sets of output variables. Typically the shader program in question will be executed for each work item (e.g. vertex in the case of a vertex shader) to be processed. Typically an execution thread will be issued for each work item to be processed, and the thread will then execute the instructions in the shader program to produce the desired "shaded" output data.

The application 102 provides the shader programs to be executed using a high-level shader programming language, such as GLSL, HLSL, OpenCL, etc. These shader programs are then translated by a shader language compiler to binary code for the target graphics processing pipeline 200. This may include the creation of one or more internal (intermediate) representations of the program within the compiler. The compiler may, e.g., be part of the driver 108, with there being a special API call to cause the compiler to run. The compiler execution can thus be seen as being part of the, e.g. draw call preparation done by the driver in response to API calls generated by an application.

Other arrangements for the graphics processor 106 would, of course, be possible.

The technology described herein relates to the situation in which the graphics processor 106 of FIG. 1 is being used to perform foveated rendering, by rendering different regions (tiles) of a render output at different resolutions, which different resolution regions (tiles) are then combined to provide an output foveated image in which the resolution varies across the image.

Figure 3:
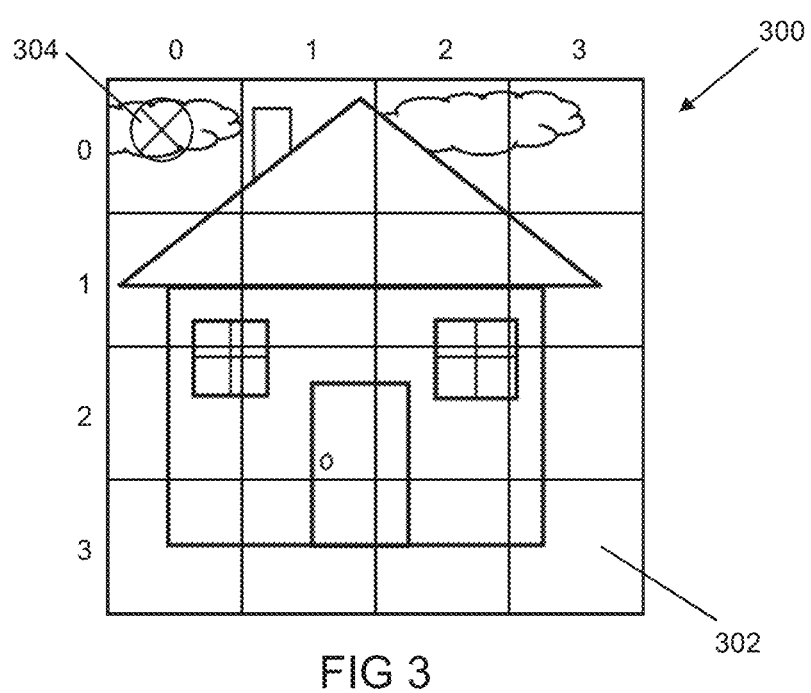
FIG. 3 shows regions of a scene to be rendered at different resolutions in accordance with an embodiment of the technology described herein.

FIG. 3 shows an example of a scene 300 to be rendered in the manner of the technology described herein. The render output that will represent the scene 300 is divided into a plurality of equally sized non-overlapping square regions (tiles), such as lower-right tile 302, that will be rendered separately. The x and y coordinates for the tile positions are also shown. For example, the lower-right tile 302 has coordinates 3,3.

As is shown in FIG. 3, a fixation point 304 for the foveated rendering is determined as being towards the upper left side of the scene 300. Thus, in this embodiment, when performing foveated rendering, the graphics processor 106 is controlled to render tiles towards the upper left of the render output at higher resolution whereas tiles towards the lower right of the render output will be rendered at progressively lower resolutions, with the different resolution regions then being appropriately combined to provide the output "foveated" image (output frame) that is, e.g., displayed.

The fact that foveated rendering is required is indicated in the present embodiment by the application 102 that requires that rendering indicating to the driver 108 for the graphics processor 106 that the regions of the render output are to be rendered to at multiple resolutions together scaling factors associated with the resolutions (and any other rendering, etc., configurations that may be desired). In response to such commands from the application 102, the driver 108 then configures appropriate tiling and rendering tasks that it sends to the graphics processor 106 to perform foveated rendering in the manner that will now be described with reference to the process 400 illustrated in FIG. 4.

Figure 4:
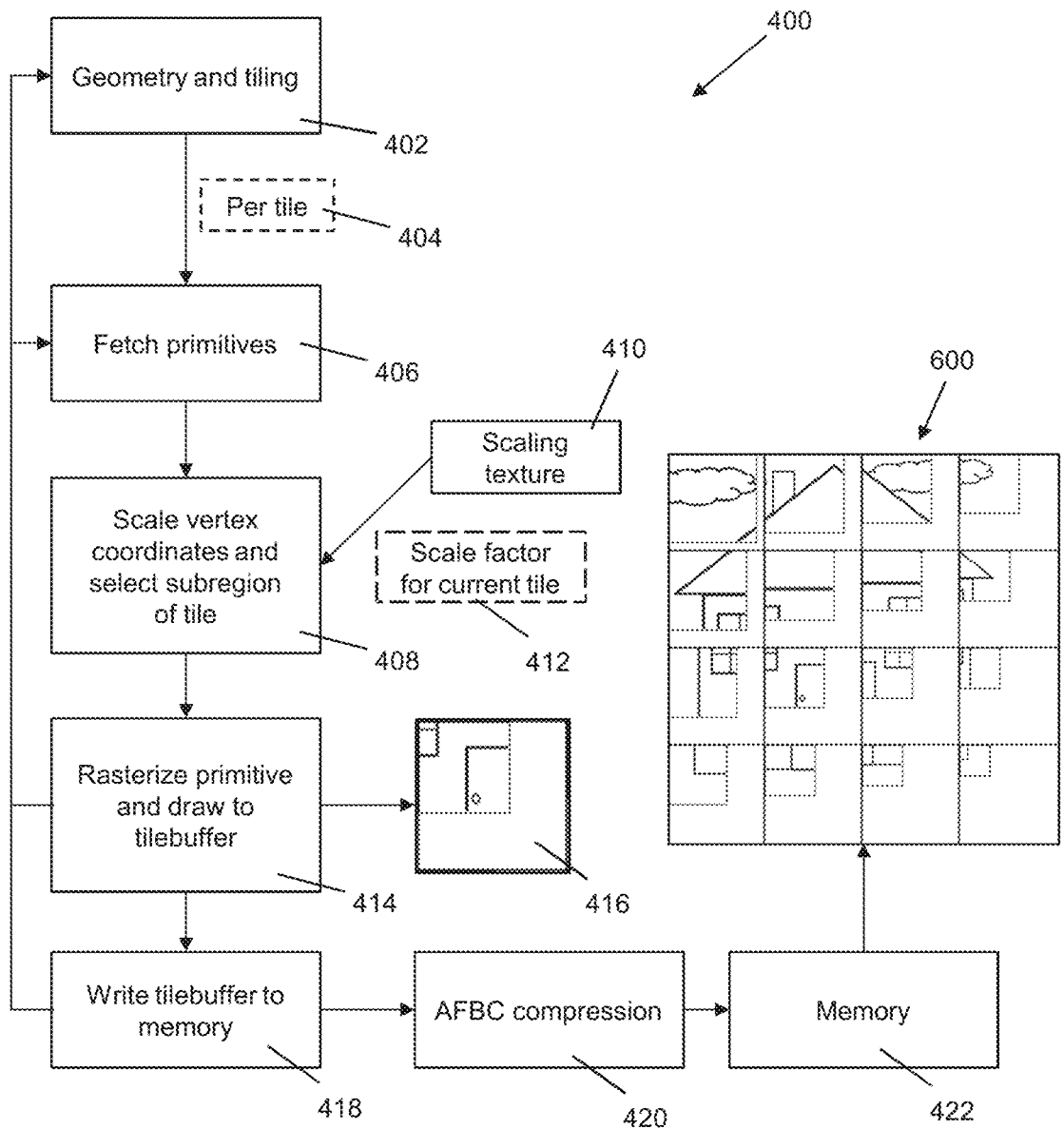
FIG. 4 illustrates a process of rendering a region of a render output at a particular resolution in accordance with an embodiment of the technology described herein.

As shown in FIG. 4, in this embodiment, in step 402, the geometry for the scene is set up and tiled (i.e. the primitives are generated and sorted into lists for respective rendering tiles) only once to provide a single set of tile geometry lists that are then used in common (shared) when rendering each respective region (for the fragment processing for rendering each respective region).

In particular, the graphics processor 106 is controlled to perform both the vertex position processing (shading) and the geometry list (primitive lists) generation process (the tiling process) only once for the scene 300 that is being rendered, at the highest resolution that is required for an output image. These processes may be performed as desired, such as in accordance with the normal operation of the graphics processor 106 for these processes, but will be done using the geometry for the scene 300 at the highest resolution that is to be rendered.

As shown in FIG. 4, once the geometry lists (the tile lists) have been prepared in this way, then at step 406 the geometry (primitives) for a region in question is then fetched using the appropriate "per tile" geometry list 404 for that tile.

Then, in step 408, the geometry is appropriately scaled based on a scaling factor 412 corresponding to the desired resolution for the tile in question. In this embodiment, the scaling factor is obtained by sampling a "scaling texture" 410 provided by the application 102 (which comprises an array of scaling factors for the respective regions of the render output). The scaling texture 410 is sampled at an array location that corresponds to the position of the tile in question within the render output.

In step 408, for a highest resolution tile (having a scaling factor of 1), the fetched geometry can simply be used as it is. However, for other, lower resolution tiles, the fetched geometry that has been prepared at the highest resolution is scaled down by the appropriate scaling factor for the region in question. This downscaling is done as part of the vertex position loading operation, but other arrangements would be possible, if desired.

In this embodiment, the following equations are used for the scaling:

tile_origin=tile_coord*tile_size internal_coord=primitive_coord−tile_origin new_coord=tile_origin+(internal_coord*scaling factor[tileID])

Where:
tile_size is the x or y size of the tile in sampling positions (pixels);
tile_coord is the x or y tile coordinate for the tile in the render output;
tile_origin is the x or y position of the origin of the tile in the render output;
primitive_coord is the coordinate for the primitive in the render output;
internal_coord is the internal coordinate for the primitive relative to the tile_origin;
tileID is a unique identifier for the tile;
scaling_factor[tileID] is the scaling factor for the tile having the tile ID; and
new_coord is the scaled coordinate for the primitive to be used when rendering the tile.

For example, for a 32×32 sampling position (pixel) tile located in the lower right corner, and thus having tile coordinates 3,3, the position of the origin of the tile would be 96,96 (i.e. 32×3,32×3). Then, for a primitive having coordinates 112,104 in the render output, the internal coordinates for the primitive relative to the tile origin would be 16,8 (i.e. 112-96, 104-96). Then, if the tile is to be rendered at half resolution and thus has an indicated scaling factor of ½, the scaled coordinate for the primitive to be used when rasterising the primitive to graphics fragments and then rendering those fragments would be 104,100 (i.e. 96+ (16*0.5), 96+(8*0.5)).

As is also shown in step 408, in accordance with the desired resolution, the appropriate subregion of sampling positions to be rasterised and rendered in respect of the region in question is also selected.

Figure 5:
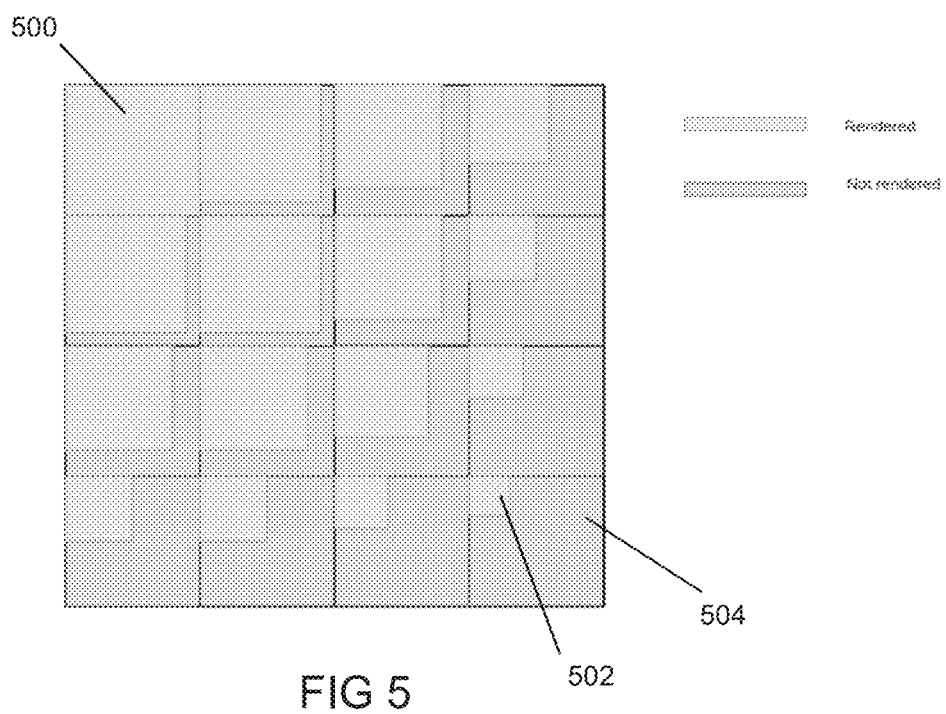
FIG. 5 shows subregions of regions of a render output that are to be rendered in accordance with an embodiment of the technology described herein.

FIG. 5 shows the subregions of sampling positions selected to be rasterised and rendered in respect of the regions of the render output. As is shown in FIG. 5, in this embodiment, the upper left tile is to be rendered at full resolution, and so a region 500 comprising all of the sampling positions of the upper left tile is selected for rasterising and rendering.

As is also shown in FIG. 5, in this embodiment, tiles are to be rendered at progressively lower resolutions away from the upper left tile, and so progressively smaller subregions of sampling positions are selected for rasterising and rendering away from the upper left tile. For example, as is shown in FIG. 5, a smaller subregion of sampling positions 502 is selected for performing rasterising and rendering in respect of the lower right tile, leaving an unselected subregion of sampling positions 504 that will not be rasterised and rendered in respect of that lower right tile. For example, when rendering at half resolution, ½ the rows and ½ the columns of sampling positions are selected, meaning that a subregion comprising ¼ of the sampling positions is selected for rasterising and rendering in respect of the region and that an unselected region comprising ¾ of the sampling positions is not selected for rasterising and rendering in respect of the region.

It should be noted here that the geometry scaling and subregion selection processes ensure that a given subregion still covers the same content of the scene 300 as the unscaled geometry and full tile, but these processes do so with fewer rendered data elements. This allows a gap-free render output to be recovered later, e.g. by expanding each subregion to fill its corresponding tile.

Referring again to FIG. 4, at step 414, the scaled geometry is then rasterised across the selected subregion of sampling positions and the resultant fragments are rendered to generate a rendered subregion of data elements 416 that is written to the tile buffer.

At this stage, if necessary for the subregion of data element in question, the subregion of data elements is also supplemented with appropriate rows and columns of padding data elements that represent uniform data, such that the array of data elements in the tile buffer is the same size in terms of data elements as the region would have been had the whole region been rendered. This can allow rendering of a region at lower resolution to be substantially transparent to subsequent processing stages. As will be discussed in more detail below, the uniform data will also tend to compress well with many commonly used compression schemes.

In other embodiments, the subregion of data elements may be upscaled such that the output array of data elements is substantially the same size in terms of data elements as the region would have been had the whole region been rendered. Again, this can allow rendering of a region at lower resolution to be substantially transparent to subsequent processing stages. In these embodiments, the scaling factors can be limited to powers of two, and the upscaling can comprise nearest neighbour interpolation, such that the upscaling will tend to result in neighbouring data elements representing the same value. Again, the subregions of substantially similar data will tend to compress well with many commonly used compression schemes.

Then, in step 418, the array of data elements is output to the frame buffer in memory. The resolutions at which the various tiles of the render output were rendered may be stored together with the render output to facilitate subsequent use of the render output. For example, the scaling texture may be stored with the render output.

Figure 6A:
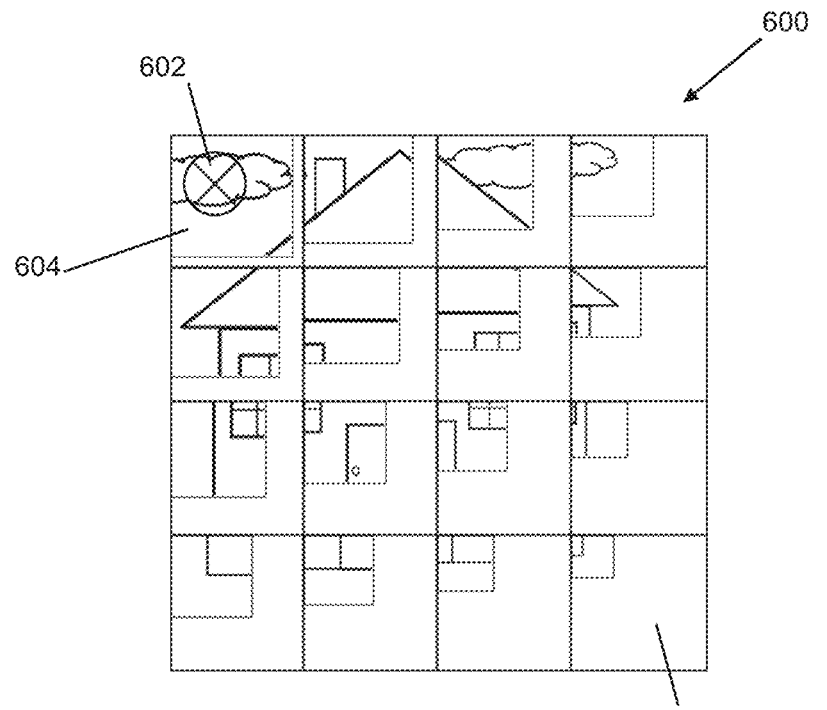
FIG. 6A shows regions of a render output that have been rendered at different resolutions in accordance with an embodiment of the technology described herein.

FIG. 6A shows regions of a render output 600 that have been rendered at different resolutions according to the present embodiment. In this embodiment, as discussed above, the fixation point 602 is towards the upper left corner of the render output 600. Thus, the upper left tile 604 has been rendered at full resolution whereas tiles towards the lower right corner, such as lower right tile 606, have been rendered at progressively lower resolutions. In this embodiment, the fixation point 602 is determined by tracking the viewer's eye movement, and so the fixation point 602 is not necessarily central and may move from frame to frame. The resolutions at which the tiles are rendered may therefore change from frame to frame depending on the viewer's head or eye movement.

Figure 6B:
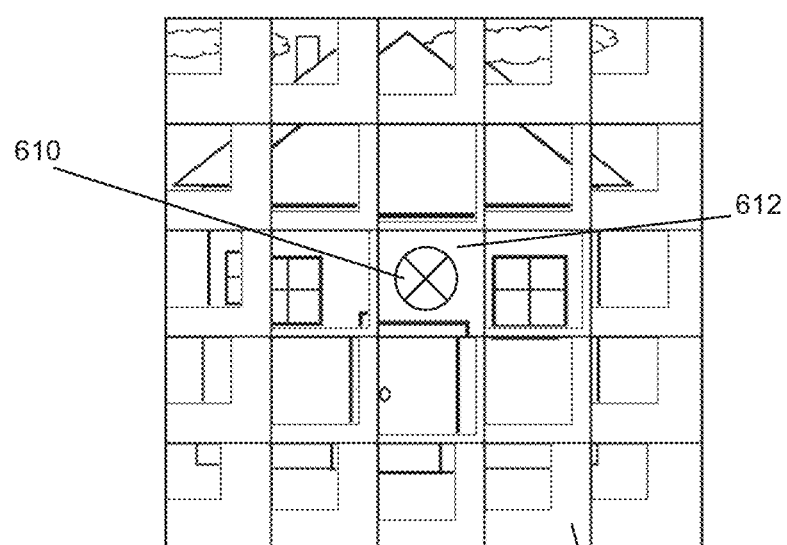
FIG. 6B shows regions of a render output that have been rendered at different resolutions in accordance with another embodiment of the technology described herein.

FIG. 6B shows regions of a render output 608 that have been rendered at different resolutions according to an alternative embodiment. In this embodiment, the render output 608 has been divided into 5×5 tiles of 32×32 sampling positions (pixels). In this embodiment, the fixation point 610 is towards the centre of the render output 608. Thus, the central tile 612 has been rendered at full resolution whereas the outer tiles, such as peripheral tile 614, have been rendered at progressively lower resolutions. In this embodiment, foveated rendering has been used because the render output will be subject to barrel distortion to correct for lens distortion, and thus the outer tiles will be minified and can be rendered at lower resolution. The fixation point 602 in this embodiment is therefore fixed at the centre of the lens that will be used to view the displayed render output.

It can thus be seen from the above that when performing such foveated rendering, the highest resolution region may be offset from the centre of the render output depending upon the position of the fixation point or points (which may, e.g., be determined through the use of gaze tracking sensors to identify where the viewer is actually looking) or may be fixed, e.g. in the centre of the render output.

Referring again to FIG. 4, in step 420, the contents of the framebuffer can be compressed, for example using Arm Frame Buffer Compression (AFBC). As discussed above, the contents of the framebuffer will tend to compress well using AFBC and other similar compression schemes that tend to compresses areas of uniform data efficiently. In AFBC, for example, each 16×16 or 32×8 "AFBC block" of data elements is internally comprised of sixteen 4×4 blocks of data elements, which are each divided into four 2×2 blocks of data elements. The amount of data needed for a 4×4 or 2×2 block of data elements can be reduced if the data elements of the block all represent the same data. Furthermore, the data for a 4×4 block of data elements can be replaced with an indication that that block is a copy of another 4×4 block of data elements that represent the same data. This indication is provided within the standard header for the AFBC block, so no additional bits are required. AFBC therefore allows efficient storage of the render output by efficiently encoding the uniform data introduced by the rendering process, and through the use of the lossless compression scheme AFBC employs for the remaining data elements. AFBC also allows random access to data values from 4×4 blocks of the compressed data without needing to decompress the entire compressed array of data elements. AFBC is described, for example, in US 2013/0034309 or US 2013/0195352, the entire contents of which are incorporated herein by reference.

Then, in step 422, the compressed data is written back to memory. The resolutions at which the various tiles of the render output were rendered may be stored together with the compressed data (e.g. in the headers for the compressed blocks of data) to facilitate subsequent use of the render output. The render output 600 can be used as desired. For example, the render output 600 can then be output to a display device or sampled when used as a texture.

Figure 7:
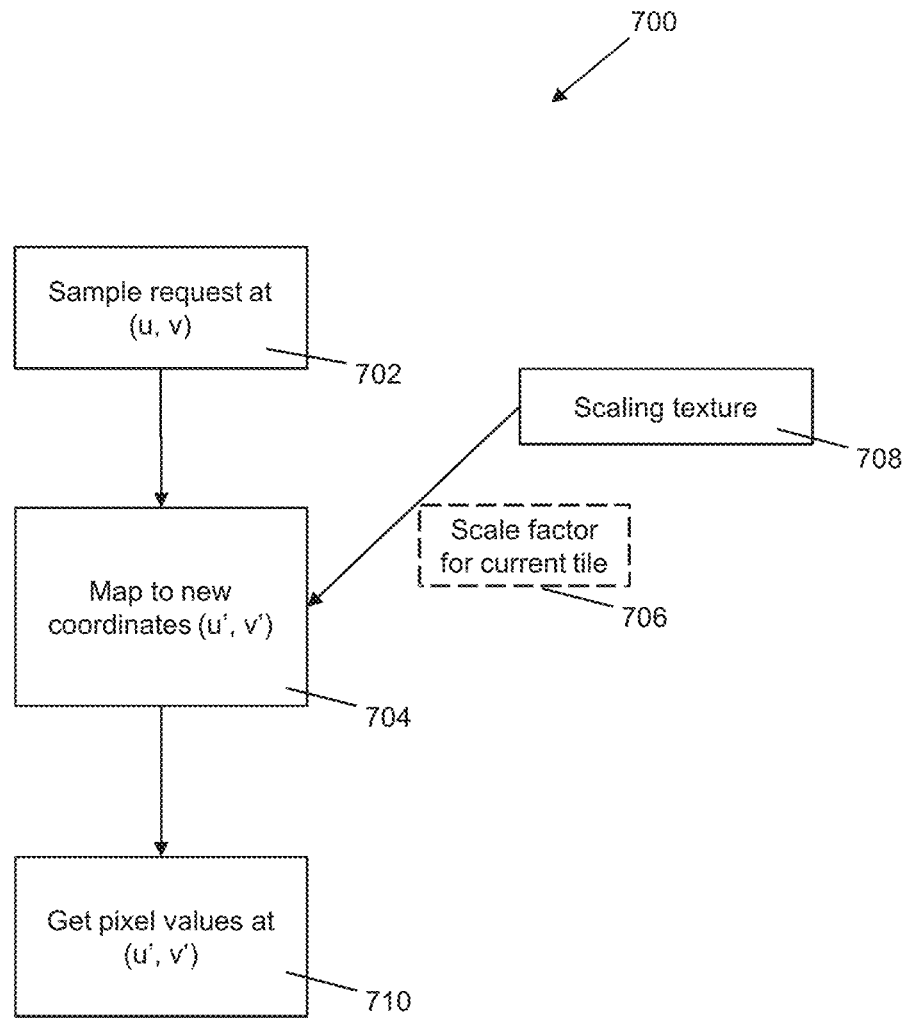
FIG. 7 illustrates a process of sampling a render output in accordance with an embodiment of the technology described herein.

FIG. 7 illustrates a process 700 of sampling a render output that has been rendered at different resolutions to sample and/or derive one or more data values, e.g. for use in texture mapping. In the present embodiment, the render output is sampled by the graphics processor, but in other embodiments the render output may be sampled by another suitable data processor, such as a display processor for display. In the present embodiment, the compressed render output is sampled directly without first decompressing and upscaling the render output. However, in other embodiments, the render output being sampled may not be and/or may not have been compressed.

As is shown in FIG. 7, at step 702, a sample is requested at a sampling position having coordinates (u,v) in the render output.

Then, at step 704, the coordinates are mapped to new coordinates (u',v') for a mapped sampling position based on a scaling factor 706 for the tile in question. In this embodiment, the scaling factor is obtained by sampling a scaling texture 708. The scaling texture 708 is sampled at a position that corresponds to the position of the tile in question within the render output.

However, as discussed above, in other embodiments, the scaling factor may instead be obtained from the header for the compressed block of data in question. In this case, the header for the relevant 16×16 or 32×8 AFBC block corresponding to the unmapped sampling position may be read in to obtain the scaling factor since that unmapped sampling position will still fall within the appropriate AFBC block.

In this embodiment, the following equations are then used for the mapping:

tile_origin=tile_coord*tile_size internal_coord=sampling_coord−tile_origin mapped_coord=tile_origin+(internal_coord*scaling factor[tileID])

Where:
tile_size is the x or y size of the tile in sampling positions (pixels);
tile_coord is the x or y tile coordinate for the tile in the render output;
tile_origin is the x or y position of the origin of the tile in the render output;
sampling_coord is the coordinate for the sampling position;
internal_coord is the internal coordinate for the sampling position relative to the tile origin;
tileID is a unique identifier for the tile;
scaling_factor[tileID] is the scaling factor for the tile having the tile ID; and
mapped_coord is the mapped coordinate for the mapped sampling position to be used when sampling the render output.

For example, for a 32×32 sampling position (pixel) tile having tile coordinates 2,1, the position of the origin of the tile would be 64, 32 (i.e. 32×2,32×1). Then, for a sampling position having coordinates 80,56 in the render output, the internal coordinates for the sampling position relative to the tile origin would be 16,24 (i.e. 80-64, 56-32). Then, if the tile has a scaling factor of ½, the scaled coordinate for the sampling position to be used when sampling the render output would be 72,44 (i.e. 64+(16*0.5), 32+(24*0.5)).

Then, at step 710, the encoded data for the relevant 4×4 or 2×2 block corresponding to the mapped sampling position is read in and a data value corresponding to the mapped sampling position is sampled and/or derived from the relevant block. The present embodiment can accordingly avoid the need to read in and decode the entire 16×16 or 32×8 AFBC block and then upscale the decoded block.

Figure 8:
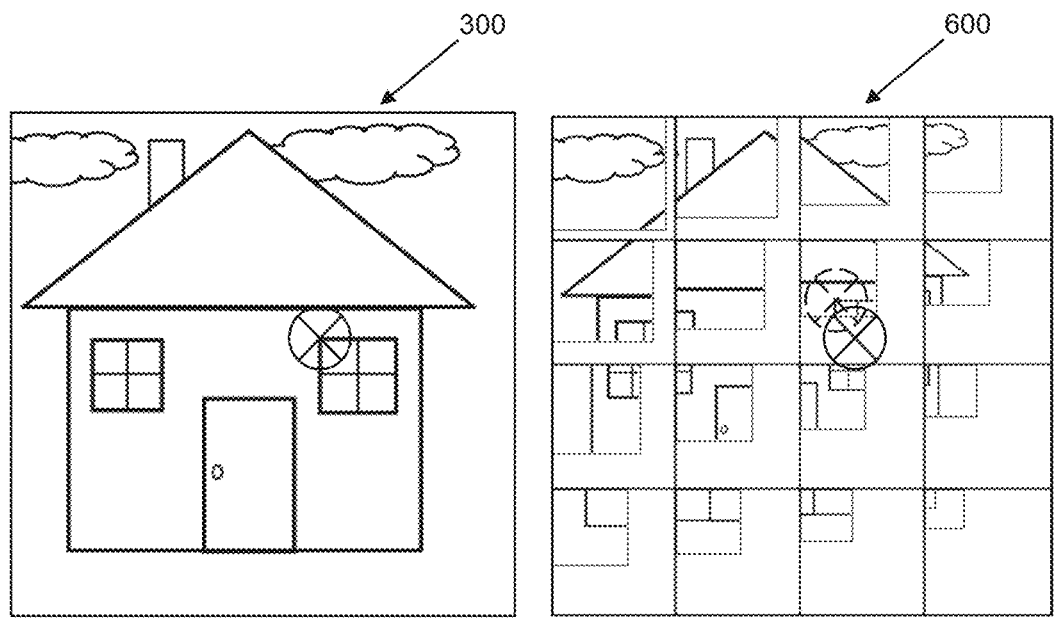
FIG. 8 shows an original sampling position and a mapped sampling position that is used to sample a render output in accordance with an embodiment of the technology described herein.

FIG. 8 illustrates the above example. FIG. 8 shows an original sampling position relative to the scene 300 of FIG. 3. FIG. 8 also shows the original sampling position and the mapped sampling position relative to the render output 600 of FIG. 6. As is shown, the sampling position is appropriately shifted up and to the left.

Embodiments other than those which have been described above are contemplated.

For example, instead of a constant resolution for a tile, it would be possible to have a variable resolution profile for a tile. In these embodiments, instead of scaling coordinates using an equation of the form x'=x*factor, the coordinates could be scaled using an equation of the form x'=x*(a+bx+cy), where x' is the new x coordinate, x and y are distances measured from the origin of the tile, and a, b and c are constants. This would allow a piece-wise linear approximation of an underlying "ideal" resolution curve, as opposed to the piece-wise constant approximation. Another variant would be to scale the coordinates using an equation of the form x'=x*(a+b*x_global+y*y_global), where a, b and c are global constants, and x_global and y_global are distances measured to the fixation point for the render output. This allows a global linear resolution profile based on the fixation point with only a few parameters.

For another example, in order to reduce potential for block artefacts appearing at the boundaries of tiles rendered at different resolutions, some overlap may be provided between the tiles to smoothly blend between the resolution levels. One way this might be achieved is to also render a region outside of the selected subregion for the tile, and then alpha-blend rendered data from adjacent tiles when sampling from the render output. In these embodiments, the tiler may use a bigger bounding box for tiling than the actual tile size.

It can be seen from the above that the technology described herein, in its embodiments at least, can provide efficient and flexible graphics processing when performing variable resolution rendering. This is achieved, in the embodiments of the technology described herein at least, by obtaining a desired resolution for a region of a render output and then, in accordance with the desired resolution, obtaining scaled graphics geometry to be rendered for the region and selecting a subregion of the region to be rendered in respect of the region. The selected subregion can then be rendered using the scaled graphics geometry so as to provide a subregion of data elements rendered in accordance with the desired resolution.

The foregoing detailed description has been presented for the purposes of illustration and description. It is not intended to be exhaustive or to limit the technology to the precise form disclosed. Many modifications and variations are possible in light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

The invention claimed is:

1. A method of operating a graphics processor comprising:
performing graphics processing in respect of a region of a render output, wherein the region is one of plural regions into which the render output is divided for rendering purposes, wherein performing graphics processing in respect of the region comprises:
obtaining a desired resolution profile for the region;
obtaining, in accordance with the desired resolution profile for the region, scaled graphics geometry to be rendered for the region;
selecting, in accordance with the desired resolution profile for the region, a subregion of the region to be rendered in respect of the region; and
performing rendering in respect of the region, wherein performing rendering in respect of the region comprises rendering the subregion of the render output using the scaled graphics geometry, thereby providing a rendered subregion of data elements;
padding an output array of data elements comprising the rendered subregion of data elements with one or more rows and/or one or more columns of data elements that correspond to sampling positions that have not been rendered in respect of the region and outputting, in respect of the region, the output array of data elements comprising the rendered subregion of data elements.

2. The method of claim 1, wherein the region comprises a graphics processing tile, the graphics processing tile being one of plural graphics processing tiles into which the render output is divided for rendering purposes.

3. The method of claim 1, wherein:
obtaining the desired resolution profile for the region comprises obtaining a particular scaling factor indicated for the region; and
obtaining the scaled graphics geometry to be rendered for the region comprises scaling, in accordance with the particular scaling factor indicated for the region, graphics geometry indicated for the region.

4. The method of claim 3, wherein the scaling factor indicated for the region is indicated in a set or array of plural scaling factors provided for, and corresponding respectively to, plural regions of the render output.

5. The method of claim 1, wherein:
selecting the subregion to be rendered in respect of the region comprises selecting one or more rows and/or one or more columns of sampling positions of the region at which to perform rendering in respect of the region; and
performing rendering in respect of the region comprises performing rendering in respect of the selected one or more rows and/or one or more columns of sampling positions.

6. The method of claim 1, further comprising compressing the output array of data elements.

7. The method of claim 1, further comprising sampling and/or deriving a data value for a sampling position from the output array of data elements, wherein sampling and/or deriving the data value for the sampling position comprises:
mapping the sampling position to a mapped sampling position based on the particular resolution at which the region was rendered; and
using the mapped sampling position to sample and/or derive the data value for the sampling position.

8. A graphics processor comprising:
a processing circuit configured to perform graphics processing in respect of a region of a render output, wherein the region is one of plural regions into which the render output is divided for rendering purposes, wherein performing graphics processing in respect of the region comprises:
obtaining a desired resolution profile for the region;
obtaining, in accordance with the desired resolution profile for the region, scaled graphics geometry to be rendered for the region;
selecting, in accordance with the desired resolution profile for the region, a subregion of the region to be rendered in respect of the region; and
performing rendering in respect of the region, wherein performing rendering in respect of the region comprises rendering the subregion of the render output using the scaled graphics geometry, thereby providing a rendered subregion of data elements; and wherein the processing circuit is further configured to pad an output array of data elements comprising the rendered subregion of data elements with one or more rows and/or one or more columns of data elements that correspond to sampling positions that have not been rendered in respect of the region; and the graphics processor further comprising:
an output circuit configured to output, in respect of the region, the output array of data elements comprising the rendered subregion of data elements.

9. The graphics processor of claim 8, wherein the region comprises a graphics processing tile, the graphics processing tile being one of plural graphics processing tiles into which the render output is divided for rendering purposes.

10. The graphics processor of claim 8, wherein:
when obtaining the desired resolution profile for the region, the processing circuit is configured to obtain a particular scaling factor indicated for the region; and
when obtaining the scaled graphics geometry to be rendered for the region, the processing circuit is configured to scale, in accordance with the particular scaling factor indicated for the region, graphics geometry indicated for the region.

11. The graphics processor of claim 8, wherein:
when selecting the subregion to be rendered in respect of the region, the processing circuit is configured to select one or more rows and/or one or more columns of sampling positions of the region at which to perform rendering in respect of the region; and
when performing rendering in respect of the region, the processing circuit is configured to performing rendering in respect of the selected one or more rows and/or one or more columns of sampling positions.

12. The graphics processor of claim 8, further comprising a compression circuit configured to compress the output array of data elements.

13. The graphics processor of claim 8, further comprising a sampling circuit configured to sample and/or derive a data value for a sampling position from the output array of data elements, wherein sampling and/or deriving the data value for the sampling position comprises:

mapping the sampling position to a mapped sampling position based on a particular resolution at which the region was rendered; and using the mapped sampling position to sample and/or derive the data value for the sampling position.

14. A data processor comprising:
a sampling circuit configured to sample and/or derive a data value for a sampling position from an output array of data elements corresponding to a region of a render output, wherein the region is one of plural regions into which the render output was divided for rendering purposes and the region was rendered at a particular resolution by selecting a subregion of the region to be rendered and performing rendering in respect of the subregion to provide a rendered subregion of data elements, and wherein the output array of data elements comprises the rendered subregion of data elements padded with one or more rows and/or one or more columns of data elements that correspond to sampling positions that were not rendered in respect of the region, wherein the sampling circuit comprises:
a sampling position mapping circuit configured to map the sampling position to a mapped sampling position based on the particular resolution at which the region was rendered; and
a data value deriving circuit configured to use the mapped sampling position to sample and/or derive the data value for the sampling position.

15. The processor of claim 14, wherein the data processor comprises a graphics processor or a display processor.

16. The processor of claim 14, wherein the output array of data elements comprises a compressed output array of data elements and wherein the compressed output array of data elements is sampled directly using the mapped sampling position.

17. The processor of claim 14, wherein sampling and/or deriving the data value for the sampling position from the output array of data elements does not comprise decompressing and/or upscaling the output array of data elements.

18. A non-transitory computer readable storage medium comprising computer software code which when executing on a processor performs a method of operating a graphics processor comprising:
performing graphics processing in respect of a region of a render output, wherein the region is one of plural regions into which the render output is divided for rendering purposes, wherein performing graphics processing in respect of the region comprises:
obtaining a desired resolution profile for the region;
obtaining, in accordance with the desired resolution profile for the region, scaled graphics geometry to be rendered for the region;
selecting, in accordance with the desired resolution profile for the region, a subregion of the region to be rendered in respect of the region; and
performing rendering in respect of the region, wherein performing rendering in respect of the region comprises rendering the subregion of the render output using the scaled graphics geometry, thereby providing a rendered subregion of data elements; and
padding an output array of data elements comprising the rendered subregion of data elements with one or more rows and/or one or more columns of data elements that correspond to sampling positions that have not been rendered in respect of the region and outputting, in respect of the region, the output array of data elements comprising the rendered subregion of data elements.

* * * * *